United States Patent
Gohe et al.

[15] 3,703,631
[45] Nov. 21, 1972

[54] MEAN SPEED INDICATOR SYSTEMS FOR VEHICLES

[72] Inventors: Raymond Gohe, Sainte Genevieve des Bois; Jean Martial Randoing, Boissise le Roi; Max Gohe, La Garenne Colombes; Jean-Claude Evrard, Perthes en Gatinais, all of France

[73] Assignees: Raymond Gohe, Sainte Genevieve; Jean Martial Randoing, Boissise le Roi, France

[22] Filed: June 11, 1970

[21] Appl. No.: 45,354

[30] Foreign Application Priority Data

June 11, 1969    France..................6919346

[52] U.S. Cl. ..........235/151.32, 235/196, 235/186, 235/179
[51] Int. Cl. .........G06g 7/16, G06g 7/78, G01p 3/52
[58] Field of Search.........235/151.32, 196, 186, 179; 73/488, 489, 490, 491; 324/160, 163

[56] References Cited

UNITED STATES PATENTS 3,005,590   10/1961   Giltinan....................235/196
2,416,363   2/1947   Wellings....................235/186

OTHER PUBLICATIONS

Analog Computation in Engineering Design; Rogers and Connolly; McGraw-Hill Book Co., Inc.; 1960; pp. 11–16.

*Primary Examiner*—Charles E. Atkinson
*Assistant Examiner*—Edward J. Wise
*Attorney*—Waters, Roditi, Schwartz & Nissen

[57] ABSTRACT

A means for speed calculator for vehicles in which the distance travelled by the vehicle and the time taken to travel such distance are converted continuously into proportional movements of two members comprises means for continuously displaying the ratio between the amplitudes of the respective movements of the members, the members being electrical components including variable means varied proportionally to the distance travelled and to the time taken respectively, the said variations producing a variation of electrical values, and means for measuring the ratio of the electrical values.

2 Claims, 2 Drawing Figures

MEAN SPEED INDICATOR SYSTEMS FOR VEHICLES

This invention relates to improvements to mean speed indicator systems for vehicles.

An object of the invention is to provide a vehicle mean speed indicator system, more particularly for motor vehicles, the system automatically dividing the distance travelled from a starting point by the time which has elapsed from a starting time, the system being small enough to be fitted on the dashboard of present-day motor vehicles and cheap enough to be mass-produced.

Numerous systems having the same object have already been proposed but they have never been put to commercial use because the above-mentioned two conditions were not satisfied. Technological development, especially in electronics, has enabled the perfecting of a new construction using electrical components, so that the said conditions can be satisfied.

Accordingly, the invention relates to a vehicle mean speed calculator of the type in which the distance travelled by the vehicle and the time taken to travel such distance are converted at all times into proportional movements of two members, means being provided whereby the ratio between the amplitudes of the respective movements of said members can be displayed at all times, characterized in that the said members are electrical components, one characteristic of which is modified proportionally to the distance travelled and to the time taken respectively, the said modifications of the characteristics providing a variation of electrical values, the ratio of which can be measured.

According to a first embodiment, the electrical component whose characteristic is modified proportionally to the distance travelled is a potentiometric resistor and the electrical component whose characteristic is modified proportionally to the time taken is a current-measuring resistor, the two resistors being connected in series, the current output being read by an electrical meter, the sensitivity faults and errors due to the internal resistance of the meter being eliminated by the fact that the system used to display the ratio between the values of the two resistors is an operational amplifier connected in parallel with a fixed resistor, the amplifier and resistor in parallel being connected in series with a meter.

According to a second embodiment, the electrical components are both potentiometric resistors which give voltages proportional to the time taken and to the distance travelled and the means used to display the ratio is a third potentiometric resistor fed by one of the said first potentiometric resistors and controlled so that its own voltage is equal to that of the other potentiometric resistor, the position of the wiper of the said third potentiometric resistor being read from a scale.

The invention will be more readily understood from the following description with reference to the accompanying drawing wherein.

Figure 1:
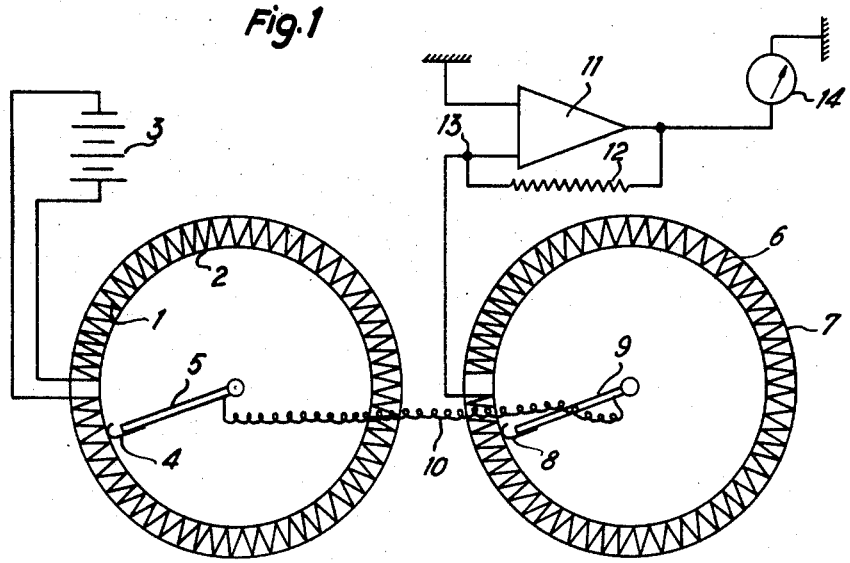
FIG. 1 illustrates the first embodiment of the invention.

Referring to the drawing, the embodiment shown in FIG. 1 uses a variable potentiometer and a variable resistor, e.g., of toroidal shapes. The variable potentiometer consists of a resistance wire 1 wound in non-contiguous turns on an insulating torus 2, the two ends of the wire being connected to the two terminals of a constant-voltage d.c. source 3. A wiper 4 is mounted at the end of a radial arm 5 which is rotated proportionally to the distance travelled and co-operates with the turns of the wire 1. The starting point of the wiper rotation corresponds to ground potential and the wiper 4 will be at a potential $V_d$ proportional to the distance travelled. The variable resistor consists of a high-resistivity wire 6 wound in non-contiguous turns on an insulating torus 7. A wiper 8 is mounted at the end of a radial arm 9 rotated by a timing mechanism and co-operates with the turns of the wire 6. The starting point for the rotation of the wiper 8 corresponds to the starting point of the wound resistor, the value $R_t$ of the resistance brought into series with the wiper 8 consequently being proportional to the time taken. The two wipers are interconnected by a conductor 10. Consequently, a voltage $V_d$ proportional to the distance covered is applied to the terminals of a variable resistor $R_t$ proportional to the time taken and the value of the current flowing through the variable resistor is proportional to the mean speed. Theoretically, it would only be necessary to connect an ammeter in series to measure the mean speed.

The resistance of the ammeter cannot be disregarded, however, in the case of small values of the variable resistor and the small potential values operative at the start of the measuring process, and this results in a systematic error. To obviate this, according to the invention, a very high gain differential amplifier 11 is used, which has a very high input impedance and which is connected in parallel with a fixed resistor 12. The input circuit of the amplifier is connected in series with the variable resistor and receives a potential difference $V_E$. As a result of the very high input impedance, the current flowing through the input circuit is very small and can even be disregarded, but because of the very high gain the voltage $V_S$ at the output is a high multiple of the input voltage. Since the current flowing through the very high input impedance at a potential difference which is only a very small fraction of the output voltage $V_S$ is very small and even negligible in practice, all the current flows through the resistor 12 in parallel and because of the voltage difference $V_E$ between the common point 13 and ground, the point 13 may be considered as an artificial ground. If $R_t$ is the value of the variable resistor proportional to the time, $V_d$ the value of the variable potential proportional to the distance travelled and $R_f$ the value of the fixed resistor 12, the equation for the currents flowing through the two resistors can be written as follows:

$$V_d/R_t = -V_S/R_f \text{ or } V_S = -V_d R_f/R_t = -R_f V_d/R_t$$

$V_S$ will therefore be proportional to $V_d/R_t$, i.e., to the mean speed which can be read directly from the dial of a voltmeter 14.

Figure 2:
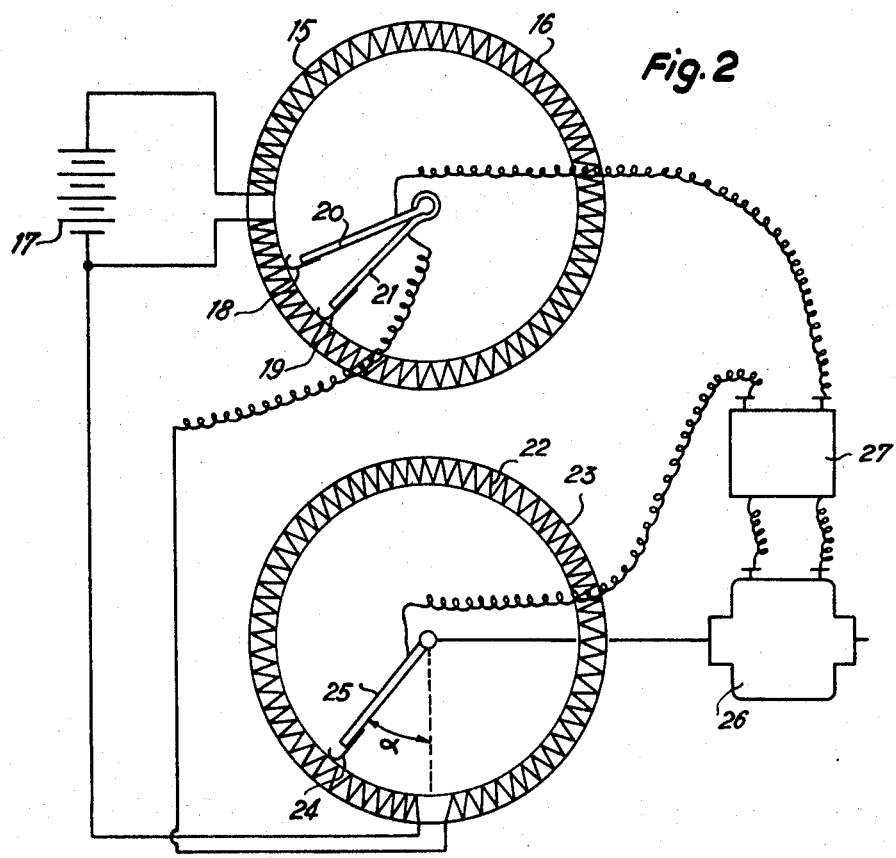
FIG. 2 illustrates the second embodiment.

In the embodiment shown in FIG. 2, two potentiometric resistors are used which consist, for example, of a resistance wire 15 wound in non-contiguous turns on an insulating torus 16 and connected to the two terminals of a d.c. source 17. The two voltages are delivered by two wipers 18 and 19 borne by needles 20 and 21 whose angular displacements are respectively proportional to the distance travelled and the time taken. These voltages are, therefore, a voltage $V_d$ proportional to the distance travelled and $V_t$ proportional to the time. The voltage $V_t$ picked up by the wiper 19 is applied to the terminals of a potentiometric resistor consisting of a resistance wire 22 wound in non-contiguous turns on an insulating torus 23. A wiper 24 co-operates with this resistor and is borne by a needle 25 rotated by a reversible d.c. motor 26 fed by a voltage amplifier and comparator 27 which receives the voltage $V_d$ proportional to the distance travelled as picked up by the wiper 18 and a voltage $V_t \times \alpha/360$ picked up by the wiper 24. The motor 26 rotates to modify the angle $\alpha$ so that the two voltages should be equal, i.e., so that $V_d = V_t \times \alpha/360$. Consequently, $\alpha/360 = V_d/V_t$. $\alpha$ is therefore proportional to the ratio of the voltages $V_d/V_t$ and hence to the mean speed. The angle $\alpha$ can be displayed by a needle which rotates with the needle 25 over a dial graduated to show mean speed. In this embodiment, the transmission ratios provided by reduction gears (not shown) between the cable from the gearbox output and the needle 20, on the one hand, and between the timing mechanism and the needle 21, on the other hand, must be such that the voltage $V_d$ delivered by the wiper 18 is less than the voltage $V_t$ delivered by the wiper 19, one revolution of the needle 25, i.e., $\alpha = 360$, corresponding to the instantaneous maximum speed of the vehicle.

We claim:

1. A mean speed calculator for a vehicle in which a distance travelled by the vehicle and the time taken to travel such distance are converted continuously into proportional movements of two members, comprising means for continuously displaying the ratio between the amplitudes of the respective movements of said members, said members being electrical components respectively including first and second variable means which vary respectively and proportionally to the distance travelled and to the time taken, the said variations producing a variation of electrical values, and further means for measuring the ratio of said electrical values, said first variable means including a potentiometer, said second variable means including a current-measuring resistor, the resistor and potentiometer being connected in series, said further means including an electrical meter for reading current output, and an operational amplifier and a fixed resistor connected in parallel with each other in series with said meter for eliminating sensitivity faults and errors due to the internal resistance of the meter.

2. A mean speed calculator for a vehicle in which a distance travelled by the vehicle and the time taken to travel such distance are converted continuously into proportional movements of two members, comprising means for continuously displaying the ratio between the amplitudes of the respective movements of said members, said members being electrical components respectively including first and second variable means which vary respectively and proportionally to the distance travelled and to the time taken, the said variations producing a variation of electrical values, further means for measuring the ratio of said electrical values, and a scale, said variable means including two potentiometers producing voltages proportional to the time taken and to the distance travelled, said means for displaying the ratio including a third potentiometer including a wiper arm and being fed by one of said two potentiometers, the voltage across said third potentiometer being equal to that across the second of said two potentiometers, the position of the wiper of the said third potentiometer being read on said scale.

* * * * *